April 11, 1950 M. B. McDAVITT ET AL 2,503,402

SELECTIVE MECHANISM

Filed May 8, 1947 3 Sheets-Sheet 1

INVENTORS M. B. McDAVITT
D. MITCHELL

BY P. C. Smith

ATTORNEY

SELECTIVE MECHANISM

Filed May 8, 1947

INVENTORS M.B.McDAVITT
D.MITCHELL
BY P. C. Smith
ATTORNEY

SELECTIVE MECHANISM

INVENTORS M. B. McDAVITT
D. MITCHELL
BY P. C. Smith
ATTORNEY

Patented Apr. 11, 1950

2,503,402

UNITED STATES PATENT OFFICE 2,503,402

SELECTIVE MECHANISM

Marcellus B. McDavitt, Hartsdale, N. Y., and Doren Mitchell, Martinsville, N. J., assignors to Bell Telephone Laboratories, Incorporated, New York, N. Y., a corporation of New York Application May 8, 1947, Serial No. 746,794

14 Claims. (Cl. 177—353)

This invention relates to selectively responsive devices and more particularly to electromagnetically actuated mechanisms which are selectively responsive to one, and only one, of several different combinations of a given number of digits having numerous combinations of pulses therein.

Heretofore in connection with selectively responsive devices or mechanisms of the electromagnetically actuated type the selection has been accomplished by means of different polarities of pulses, different amplitudes of pulses, different pulse widths, different time intervals between pulses and others comprising various combinations of these somewhat basic means. The present invention is concerned, in the disclosure herein set forth, with what is preferred to be called a digital code system wherein a series of consecutive groups of pulses is transmitted to several devices. Each group of pulses comprises a plurality of individual pulses, the only limitation on which is that the pulses of each of the said groups be separated by not more than a given amount of time. The only limitation upon the series of groups is that the consecutive groups of said series be separated by not less than a given amount of time, the latter amount of time being slightly larger than the former mentioned amount of time. The device to which the series of groups of pulses is transmitted is adapted to respond, by signalling or otherwise, to only one series of groups wherein there are a certain prearranged number of pulses for each group and the groups are transmitted in a certain prearranged sequence.

Heretofore devices selectively responsive to a digital code have been restricted in their versatility in that irrespective of the number of digits or pulse groups transmitted and irrespective of the maximum possible number of pulses in any one group these devices have been restricted to respond satisfactorily to less than the theoretically possible maximum number of digital codes available from such a system. The restriction was in general that the devices could respond only to a series of groups of pulses, or series of digits wherein the sum of the digits added up to a specific number of impulses.

It is one feature of the present invention to provide a mechanism of the class mentioned above which is capable of responding satisfactorily to a digital code regardless of the number of digits in the series of same and irrespective of the number of pulses in any digit or group of the said series. For instance, as disclosed herein by example, a digital code system employing four digits with a possible maximum of ten pulses per digit presents ten thousand possible different codes using the four digits in all possible combinations and with all possible pulse contents of each digit. The invention herein disclosed is capable of selectively responding to any one of these ten thousand codes while being incapable of responding to any other of the codes when adjusted to respond to the said one of said codes. The present exemplary disclosure of the invention is therefore capable of responding to an unrestricted four-digit code, the word "unrestricted," as it is used herein, meaning not restricted in its capability of responding to any one of the possible maximum number of codes as previously explained.

In accordance with the present invention a rotatable disc is provided in each selective device for each digit of the code system used. These discs are rotated by means of a stepping mechanism cooperating with a ratchet wheel attached to each disc. The said discs are each provided with an aperture therethrough, which may take the form of a notch or slot adjustable along or near the periphery of each of the said discs, and said discs are arranged so that the said apertures or slots may be aligned for passage therethrough of a bar, key or rack, similarly to the operation of a combination lock. The stepping mechanism is arranged to step the first of said discs a number of ratchet steps corresponding to the pulse content of the first digit of the code. If the pulse content of the first digit corresponds to the preset peripheral position of the slot in said first disc, the said slot will have been positioned so that another stepping mechanism may advance the bar or key through the said slot in the time interval between the first and second digit. Connected to or actuated by the said key is a cam mechanism which cooperates with the ratchet stepping mechanism to enable the stepping thereby of only one of said discs at any one time. When the key is advanced through the aperture or slot in the first disc, after same has been advanced the proper number of ratchet steps as previously mentioned, the cam device will disable the stepping mechanism from advancing the first disc and will enable it to advance the next disc of the series, all other discs being disabled similarly to the first. This process may be repeated for as many discs as are desired consistent with the number of digits in the code employed. Each successive digit, if correct for respective successive discs of the device in question, will properly orient the discs and successively enable succeeding discs to be rotated such that at the conclusion of the last digit of the correct code the key will be advanced through the last disc, which movement may be manifested in actuation of a signal to indicate proper and complete response of the device to a code transmitted thereto.

In the embodiment of the invention disclosed herein by example, an unrestricted four digit code is assumed for the purpose of actuating a device of the character described briefly above. Four discs are employed, each being adjustably attached to a ratchet wheel. The four ratchets are freely and independently mounted on a common shaft. An electromagnetic stepping means is provided having one armature which is adapted to actuate four resilient spring drive pawls, each of which is intended to cooperate with one of said ratchet wheels. These spring pawls normally rest out of engagement with their respective ratchets and normally cannot engage same when the stepping magnet armature is operated. The key, bar or rack, as it is referred to in the appended claims, is provided with teeth for the purpose of being stepped or advanced by a progression magnet drive pawl when the progression magnet is energized at the end of each digit. The rack or key has an arm attached thereto with a cam surface on the end thereof, said cam being suitably positioned to engage and deflect one ratchet spring pawl at a time to a position where it can engage its ratchet when its associated stepping magnet armature is operated. When the key is advanced at the end of each digit, the cam is advanced to enable the next spring pawl and, of course, disable the first as well as all others except the second, etc. Further electromagnetic means are employed as holding mechanisms to retain advanced the respective ratchets and the said rack. This latching or holding means, as will be hereinafter fully described along with the above-mentioned apparatus, is arranged to release the whole device to normal under certain conditions of operation. If and when the key has been successfully advanced through the apertures or slots of all four discs during response of the device to one code combination of a four digit code, it may be adapted to close a signalling circuit or perform a similar function.

The purpose and general description of the invention having been set forth briefly above, a detailed description of the disclosed embodiment thereof is hereinafter provided in connection with the drawings which form a part of this disclosure. The various figures of these drawings are described generally as follows.

Figure 1:
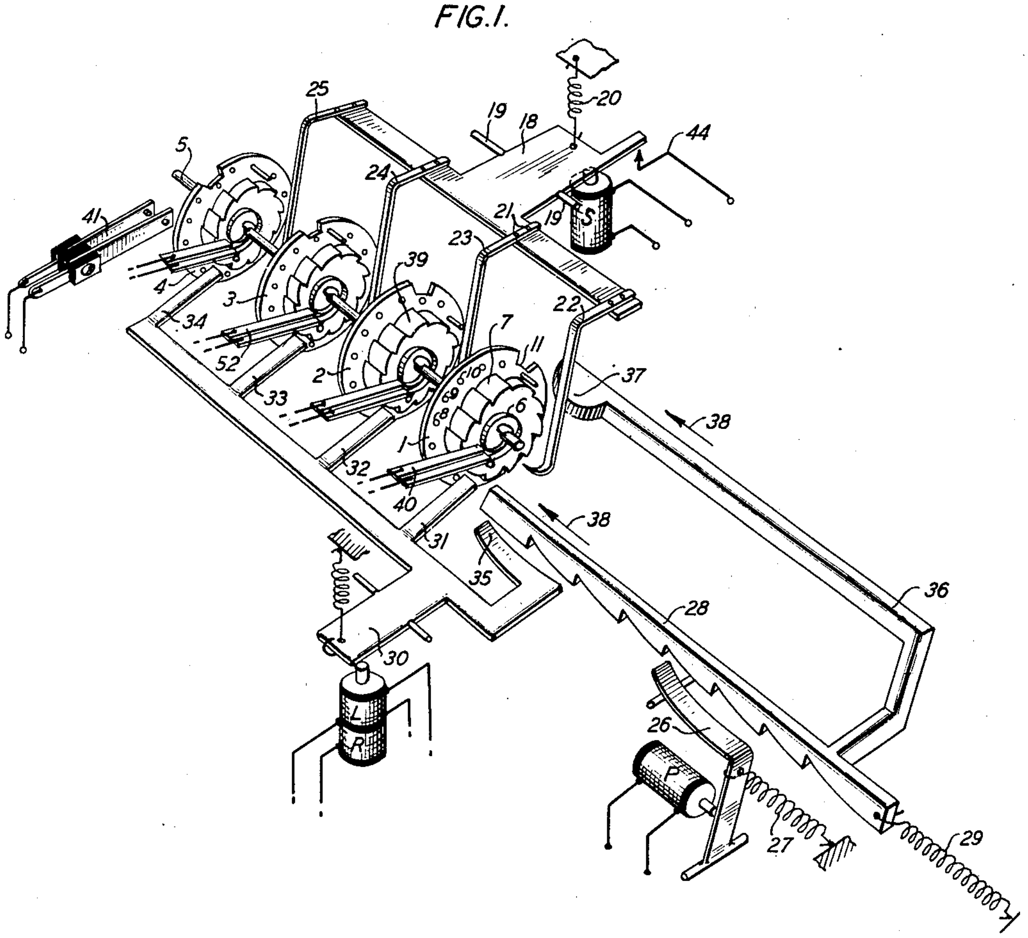
Fig. 1 is a perspective view of the device shown in its normal condition or position and thereby arranged to respond to the first digit of a code combination.

Referring mainly to Fig. 1, four discs 1, 2, 3 and 4 are shown spaced along a shaft 5. Each of the discs is freely rotatable about shaft 5 under the control of a retractile spring such as 6 for the disc 1. Each disc, such as 1, is attached to a ratchet wheel, such as 7, to which in turn said spring 6 is fixed on one end, the other end of said spring being rigidly secured to shaft 5. Each of the discs, such as 1, is provided with a ring of holes, such as 8, 9, 10, etc., along and near the periphery of the disc 1. These discs are also provided with slots, such as slot 11 for disc 1, in their peripheries, the purpose of which has been mentioned briefly heretofore and which will be more fully explained later.

Figures 3, 4, 5, 6, 7, 8:
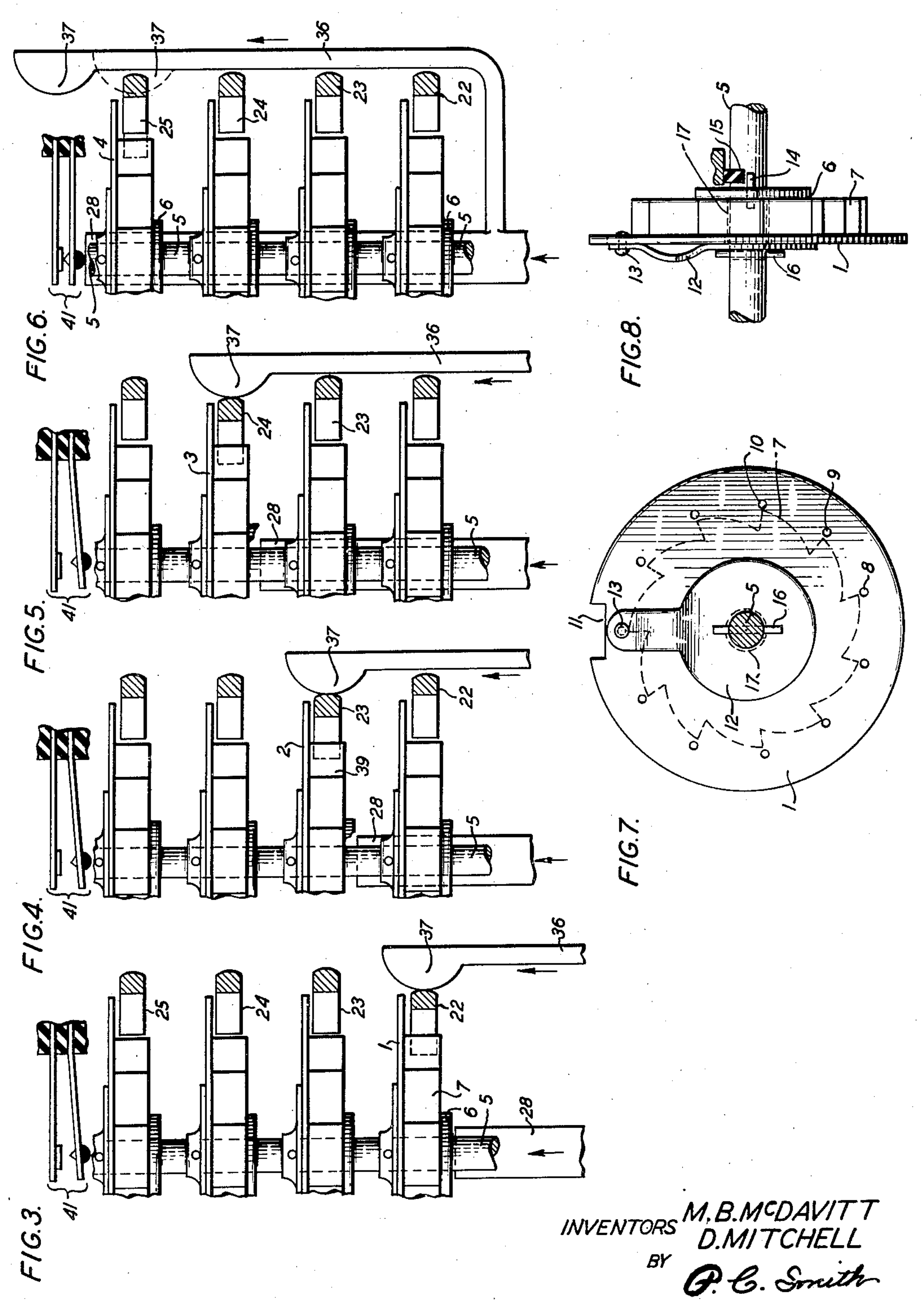
Figs. 3, 4, 5 and 6 are views which represent four steps through which the device is advanced in effecting a proper response to a coded group of digits.
Figs. 7 and 8 are two views of one of the disc and ratchet assemblies of the device of Fig. 1 which are provided to show the means for holding the adjustable disc to the ratchet, to show how the code of the device may be changed readily and to show other details to be mentioned hereinafter.

By referring to Figs. 7 and 8, enlarged views of the disc-ratchet-spring assembly, it is seen that ratchet wheel 7 is positioned on shaft 5 between spiral rectractile spring 6 and disc 1, said disc 1 being in turn confined in its position against ratchet wheel 7 by means of leaf spring 12. Leaf spring 12 has a pin 13 attached to the free end thereof which is adapted to enter one of the holes such as 8, 9, 10, etc., of disc 1 to thereby position the slot 11 as desired with reference to the normal position of ratchet 7, in turn determined by stop pin 14 on ratchet wheel 7 engaging a fixed back stop 15 under the action of spiral spring 6. This adjustability of the position of slot 11 comprises the means for setting the code to which the device will respond satisfactorily. The leaf spring 12 is confined by pin 16 passing through the shaft 5 as shown. The leaf spring 12 and ratchet wheel 7 may be connected or secured together, being commonly secured to a sleeve bearing, such as 17 of Fig. 8, it being necessary only that disc 1 be freely rotatable about said sleeve 17 with respect to both leaf spring 12 and ratchet wheel 7 when pin 13 is not engaging a hole such as 8, 9, 10, etc. in disc 1.

Referring again to Fig. 1 a stepping magnet S is provided with an armature 18 pivoted by means of pins 19 and biased away from the core of magnet S by spring 20. Attached by means of rivets 21 or the like to armature 18 are four resilient insulating pawls 22, 23, 24 and 25. These pawls are normally out of engagement with their respective ratchets and normally will not engage their respective ratchets even when actuated by armature 18, except for a condition to be explained later. The pawls such as 22 for ratchet 7, are of insulating material in this particular disclosure only because it is necessary, due to the particular control means employed, for armature 18 to carry electric current. An alternate method of operation would be to supply a well-known set of contacts to be closed by the operation of armature 18. This would allow the pawls to be made of any convenient material.

A progression magnet P is provided with combined armature and pawl 26. The armature-pawl 26 is normally biased by spring 27 and adapted when actuated by energization of magnet P to engage and advance the rack or key bar 28 against the bias of its spring 29. A latch magnet L, having a releasing winding R thereon, is arranged to actuate an armature 30 having attached thereto various holding pawls 31, 32, 33 and 34 for cooperating with ratchets such as 7, and a pawl 35 for cooperating with rack 28. Armature 30 when operated will hold all ratchets and the rack 28 in whatever advanced positions they may have assumed while armature 30 is operated. Release of the magnet L at any time will of course permit all ratchets and said rack 28 to revert to normal positions shown in Fig. 1.

Figure 2:
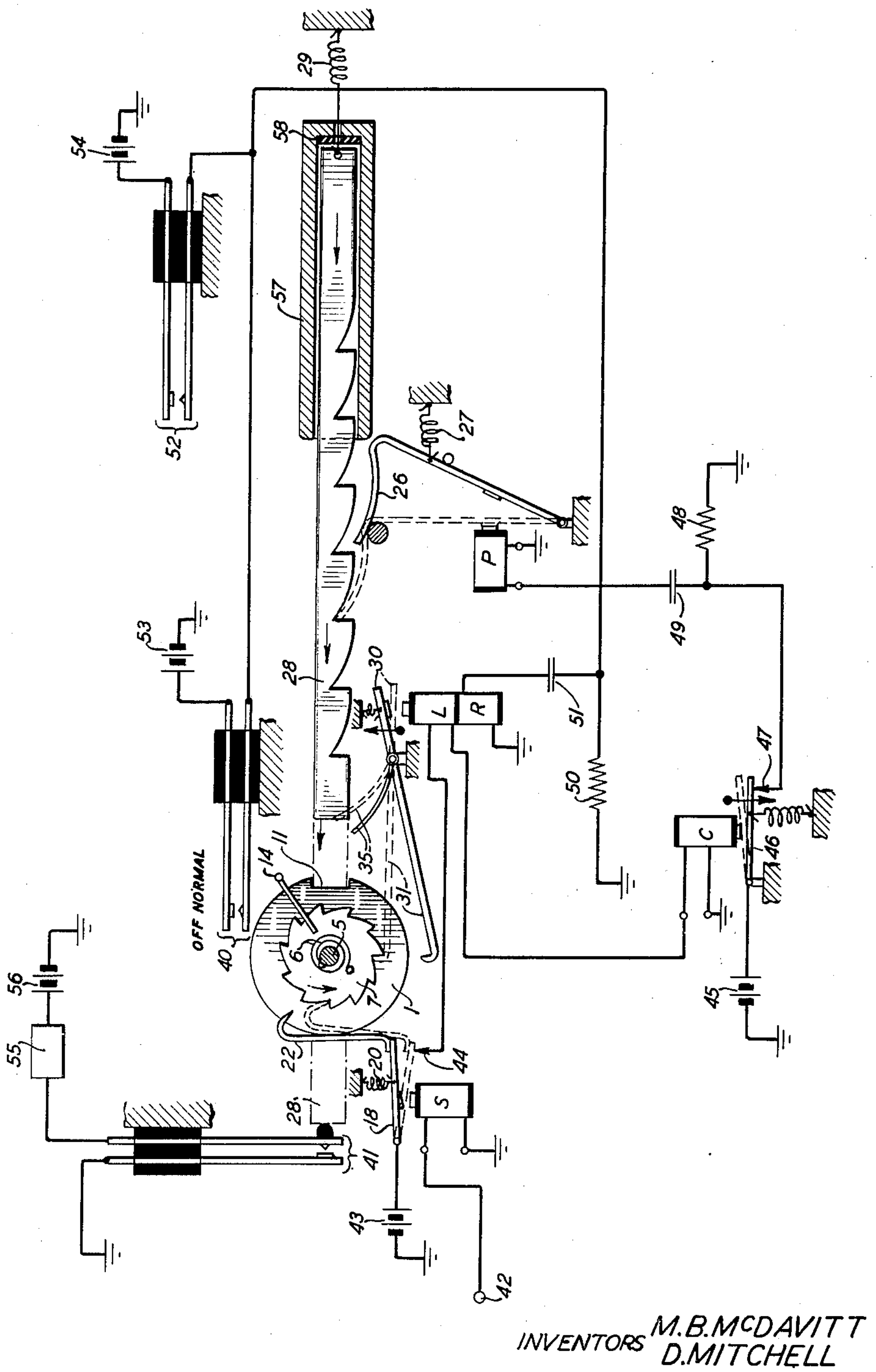
Fig. 2 is an electrical and mechanical schematic representation to be referred to in connection with the subsequent description of the electric circuits and electromagnetic devices chosen to represent one manner of operating and controlling the device of Fig. 1.

Rack 28 has an arm 36 attached thereto, said arm 36 having a cam surface 37 at its forward extremity. The cam 37 is for the purpose of deflecting the spring pawls, such as 22, to a degree which will permit said pawl 22 to engage ratchet 7 when magnet S is energized. Cam 37 is seen to so enable only one pawl at a time. As the rack 28 and arm 36 advance in the direction of arrows 38 under control of magnet P, the cam 37 will successively enable the next succeeding pawl and disable the immediately preceding one. Thus only one ratchet can be stepped at any one time. Magnet P is arranged to be energized at the end of each digit of the code to thereby advance the rack 28, provided slot 11 has been advanced to the proper position, to the next position where rack 28 will be in slot 11 and cam 37 will enable ratchet 39 to be stepped by magnet S during the next digit. Latch magnet L is a slow releasing magnet which will remain operated, unless winding R is energized, during the intervals between pulses of a digit as well as between digits of a code group. A control relay C, shown on Fig. 2, is a slow releasing relay which will remain operated during the intervals between pulses of a digit but which will release during the interval between digits of a given code group of such digits. Relay C, as will hereinafter be more fully explained, in releasing between digits, enables magnet P to be energized and to thereby actuate rack 28 and cam 37 as previously explained.

Each disc-ratchet assembly is provided with a pair of off-normal contacts, such as 40 for disc 1. A pin, such as 14 of Fig. 8, may be employed to close contacts 40 if disc 1 should be rotated more than say ten ratchet steps, whereupon, due to circuit connections to be explained later, the releasing winding R of magnet L is energized to release the whole device to normal as previously mentioned. However, if rack 28 is successfully advanced through all four discs as a result of response of the device of Fig. 1 to the correct four digit code, rack 28 will close signalling contacts 41 to signal proper reception of the code. In this connection Figs. 3, 4, 5 and 6 are set forth to indicate somewhat schematically, various steps of progression of rack 28 and cam 37 in advancing through the discs to effect closure of contacts 41. Fig. 3 represents the condition of Fig. 1 where rack 28 has not passed through disc 1 and cam 37 is enabling pawl 22. This prepares disc 1 and ratchet 7 to respond to the first digit. If the pulse content of the first digit is correct the slot 11 of disc 1 will be positioned such that rack 28 can pass therethrough when magnet P is energized. This condition is shown in Fig. 4 where rack 28 is in slot 11 of disc 1 but has not passed through disc 2 and where cam 37 has disabled pawl 22 and has enabled pawl 23 to permit the second digit to actuate disc 2 by means of ratchet 39. If the second digit is of the correct pulse content the mechanism advances to the condition of Fig. 5 and so forth until after the fourth successful digit the condition of Fig. 6 exists where rack 28 has closed signalling contacts 41. The dotted position of cam 37 in Fig. 6 merely indicates the missing step between Figs. 5 and 6 not thought necessary of repetitive description.

It is thought convenient at this point to refer to Fig. 2 with an explanation of the relay circuits heretofore briefly described and mentioned. It should be borne in mind when referring to Fig. 2 that no effort has been made to set forth accurate structure and reference should be made to preceding discussion therefor since Fig. 2, for the sake of clarity, has been prepared as a mechanical and electrical schematic representation.

The signal or code pulses are supplied to the winding of stepping magnet S by means of terminal 42 thereof. It will be remembered from previous discussion that the cam 37 of arm 36 attached to rack 28, when in its normal position, enables the stepping of the first ratchet wheel 7. When magnet S is energized the ratchet 7 is stepped a number of steps equal to the number of pulses to which magnet S responds. It may be assumed that this number of pulses is sufficient to so position slot 11 of disc 1 so that rack 28 will pass therethrough when advanced. Upon the response of magnet S to the first pulse of the first digit a circuit is completed for the slow releasing latch magnet L from ground through battery 43, operated armature 18 of magnet S, front contact 44 of magnet S to ground through the energizing windings of magnet L and slow releasing control relay C. Magnet L and relay C operate and each is adapted to remain operated during the time interval between pulses of any one digit. In addition, as has been mentioned previously, magnet L remains operated during the time interval between digits, relay C releasing during this time interval. The operation of magnet L will position holding pawls, such as 31 and 35, to hold advanced both ratchets, such as 7, and the rack 28. These holding pawls then will be so positioned throughout the response of the device to the whole code group of digits, provided the time interval between pulses or between digits is not longer than the slow releasing time of magnet L and provided the releasing winding R of magnet L is not energized in the meantime. Under the assumed normal condition of the device it is seen that the releasing winding R of magnet L is in circuit from ground, through winding R, and condenser 51 to ground through resistance 50, its alternate circuit to ground through battery 53 or 54 being open at respective off-normal contacts 40 or 52.

Prior to the operation of control relay C, the winding circuit of progression magnet P comprises said winding from ground to ground through condenser 49 and resistance 48 and also through condenser 49, back contact 47 of magnet C, unoperated armature 46 of relay C to ground through battery 45. It is thus clear that prior to operation of relay C there is no current through the winding of magnet P. Thus said magnet, as shown in Fig. 2, is not energized and its armature-pawl 26 is biased to normal by spring 27. When relay C operates, as above explained, the circuit from battery 45 to condenser 49 and resistance 48 is opened permitting the charge on condenser 49 to leak away slowly through the winding of magnet P and through resistance 48. The values of capacity 49 and resistance 48 are to be chosen such that this discharge current is too small to actuate magnet P.

At the completion of a successful first digit, the control relay C will release effecting a surge of current through the winding of magnet P through the previously described circuit of battery 45, armature 46, contact 47, condenser 49, and winding of magnet P to ground. Magnet P will operate to advance the rack 28 one step where it will be retained by pawl 35. At the conclusion of this transient current the condenser 49 will be charged up to normal and magnet P will release to normal. The advance of rack 28 and arm 36 with cam 37 on the forward end thereof will, as previously explained, disable the first ratchet drive mechanism and will enable the second ratchet to be stepped. The next digit of the code is then received by magnet S and the above process repeated. After four successful digits of a code, having time intervals between pulses of digits and between digits in accordance with previously mentioned margins of operation of slow releasing magnet L and relay C, the rack 28 will have been advanced four successive steps through all four discs to thereby close signalling contacts 41, which will in turn enable the operation of a signal, such as bell 55 by means of an obvious circuit through battery 56.

If, due to spurious pulses such as by static or lightning interference, any ratchet should be stepped more than ten steps the pin, such as 14 on ratchet 7, will be advanced to a position where it can close off-normal contacts, such as 40 or 52 depending on the particular ratchet involved. The closing of these contacts 40 or 52 will permit a surge of current to be supplied to the releasing winding of latch magnet L from battery 53 or battery 54. This surge of current will effect the release of magnet L and thereby the release of all ratchets and the rack 28, to thereby revert the whole device to its normal position of Fig. 1. The same condition will be effected by cumulative advance of any one ratchet by successive digits if any previous digit were of incorrect pulse content to properly position slot 11 for passage therethrough of rack 28 since, if rack 28 is not permitted to advance, the same ratchet is again subjected to the stepping action of the next succeeding digit.

It is of course obvious that signalling contacts, such as 41, can effect numerous operations other than actuation of a bell 55. It could operate a motor, energize a vacuum tube, operate another relay, etc. Likewise, the source of digital codes (not shown) which is effective to energize magnet S could be connected to the device at terminal 42 by wire or radio means since both types of pulse transmission are well known in the art.

Since it is not intended that the scope of the invention be limited to the embodiment disclosed herein claims are appended which alone define the scope of this invention.

What is claimed is:

1. A selectively responsive device adapted to respond to any one of a plurality of plural-digit codes and adapted to enable the operation of a signal in responding to only one of said codes, said device comprising a plurality of settable members, a setting mechanism common to said members and operative in response to the digit impulses of any code to set members in accordance with said digits, and means responsive to the settings of the preceding members for successively enabling said setting mechanism to operate a succeeding one of said settable members.

2. A selectively responsive device adapted to respond to any one of a plurality of plural-digit codes and adapted to enable the operation of a signal in responding to only one of said codes, said device comprising a plurality of settable members, a setting mechanism common to said members and operative in response to the digit impulses of any code to set said members in accordance with said digits and means responsive to the settings of preceding members for successively enabling said setting mechanism to operate succeeding ones of said settable members.

3. A selectively responsive device adapted to respond to any one of a plurality of plural-digit codes and adapted to enable the operation of a signal in responding to only one of said codes, said device comprising a plurality of settable members, a setting mechanism common to said members and operative in response to the digit impulses of any code to set each of said members in accordance with a different digit, and means responsive to the setting of a preceding member for enabling the said setting mechanism to set the immediately succeeding one of said settable members.

4. A selectively responsive device adapted to respond to any one of a plurality of plural-digit codes and adapted to enable the operation of a signal in responding to only one of said codes, said device comprising a plurality of settable members, a setting mechanism common to said members and operative in response to the digit impulses of any code, means for successively enabling said setting mechanism to operate successive ones of said settable members, and means operable by each of said settable members for blocking the operation of said former means when a settable member is set into any position other than the position required by a predetermined code.

5. A selectively responsive device adapted to respond to any one of a plurality of plural-digit codes and adapted to enable the operation of a signal in responding to only one of said codes, said device comprising a plurality of rotatably settable members, a mechanism for rotating said members and operative in response to the digit impulses of any code, means for successively enabling said mechanism to rotate successive ones of said settable members, and means operable by any one of said settable members for preventing said former means from enabling the rotation of a next successive settable member when a preceding settable member is set into any position other than the position required by a predetermined code.

6. A selectively responsive device adapted to respond to any one of a plurality of plural-digit codes and adapted to enable the operation of a signal in responding to only one of said codes, said device comprising a plurality of rotatably settable plates, each plate having an aperture therein, said apertures arranged in accordance with said code, a mechanism for successively rotating said plates in response to the impulses of successive digits of said code, mechanical means operable at the termination of each digit of said code for testing the rotated position of said apertures, said means mechanically cooperating with said rotating mechanism to prevent the latter from rotating a successive plate when the aperture of the preceding plate is tested as rotated into any position other than the position required by a predetermined code.

7. A selectively responsive device adapted to respond to any one of a plurality of plural-digit codes and adapted to enable operation of a signal in responding to only one of said codes, said device comprising a plural number of rotatable plates, each plate having an aperture therein, said apertures arranged in accordance with said code, a mechanism for successively rotating said plates in response to said code, means for enabling said mechanism to rotate only one of said plates from its normal position in response to any one digit of the said code and for testing the resulting rotated position of said aperture of said one plate, said means adapted to enable rotation by said mechanism of a second plate when the rotated position of said aperture of said one plate is tested by said means to be representative of the pulse content of said one digit, and so forth, whereby said means is further adapted to enable operation of said signal after having found the respective rotated positions of respective apertures of said plates to have been respectively representative of the pulse contents of successive digits of said code.

8. A selectively responsive device adapted to respond to any one of a plurality of plural-digit codes and adapted to enable operation of a signal in responding to only one of said codes, said device comprising a plural number of ratchet wheels, a disc adjustably attached to each ratchet and having an aperture therethrough near the periphery thereof, said discs being preset relative to the normal positions of respective ratchets such that the normal positions of said apertures represent the digits of said code, a mechanism for stepping said ratchets in response to said code, mechanical means for enabling said stepping mechanism to step only one of said ratchets from its normal position in response to any one digit of said code and for testing the resulting stepped position of said aperture of said one disc, said mechanical means adapted to enable stepping by said mechanism of a second ratchet when the stepped position of said one aperture of said one disc is found by said mechanical means to be representative of the pulse content of said one digit, and so forth, whereby said mechanical means is further adapted to enable operation of said signal after having found the respective stepped positions of the respective apertures of said discs to have been respectively representative of the pulse contents of successive digits of said code.

9. A selectively responsive device adapted to respond to any one of a plurality of plural-digit codes and adapted to enable operation of a signal in responding to only one of said codes, said device comprising a plural number of ratchet wheels, a disc adjustably attached coaxially to each ratchet, each disc having a slot in the periphery thereof, each of said discs being preset relative to the normal position of its respective ratchet such that the rotary position of its slot represents a digit of said code, an electromagnetic stepping mechanism for stepping said ratchets, each of said ratchets cooperating with a separate resilient drive pawl controlled by said stepping mechanism and normally unable to drive its respective ratchet, an electromagnetically actuated rack having a cam ended arm actuated by said rack and normally positioned such that said cam deflects the drive pawl of the first of said ratchets to enable said ratchet to be stepped thereby and such that said rack is opposite the periphery of said first disc, said rack adapted to be advanced through the slot in said first disc when same is stepped to a position opposite to said rack by the response of said stepping mechanism to the pulses of the first digit of said code, said rack when advanced enabling said cam ended arm actuated thereby to disable said first drive pawl and enable a second drive pawl, and so forth, whereby said rack is further adapted to close signalling contacts to enable operation of said signal after having passed successively through the slots in all of said discs in response to successive digits of said code corresponding to the stepped positions of said slots.

10. A selectively responsive device adapted to respond to any one of a plurality of four-digit codes and adapted to enable operation of a signal in responding to only one of said codes, said device comprising four ratchet wheels, a disc adjustably attached coaxially to each ratchet, each disc having a slot in the periphery thereof, each of said discs preset relative to the normal position of its respective ratchet such that the rotary position of its slot represents a digit of said code, an electromagnetic stepping mechanism for stepping said ratchets, each of said ratchets cooperating with a separate resilient drive pawl controlled by said stepping mechanism and normally unable to drive its respective ratchet, an electromagnetically actuated rack having a cam ended arm actuated by said rack and normally positioned such that said cam deflects the drive pawl of the first of said ratchets to enable said ratchet to be stepped thereby and such that said rack is opposite the periphery of said first disc, said rack adapted to be advanced through the slot in said first disc when same is stepped to a position opposite to said rack by the response of said stepping mechanism to the pulses of the first digit of said code, said rack when advanced enabling said cam ended arm actuated thereby to disable said first drive pawl and a second drive pawl and so forth, whereby said rack is further adapted to close signalling contacts to enable operation of said signal after having passed successively through the slots in all four of said discs in response to the four successive digits of said code corresponding to the stepped position of said slots.

11. A selectively responsive device adapted to respond to any one of a plurality of unrestricted four-digit codes and adapted to enable operation of a signal in responding to only one of said codes, said device comprising four parallel and independently rotatable ratchet wheels spaced on a common shaft, a disc adjustably attached coaxially to each ratchet, each disc having a slot in the periphery thereof, each of said discs preset relative to the normal position of its respective ratchet such that the rotary position of its slot represents a digit of said code, an electromagnetic stepping mechanism for stepping said ratchets, each of said ratchets cooperating with a separate resilient drive pawl controlled by said stepping mechanism and normally unable to drive its respective ratchet, an electromagnetically actuated rack having a cam ended arm attached thereto and normally positioned such that said cam deflects the drive pawl of the first of said ratchets to enable said ratchet to be stepped thereby and such that said rack is substantially perpendicular to said discs and is opposite the periphery of said first disc, said rack adapted to be advanced through the slot in said first disc when said disc is stepped to a position opposite to said rack by the response of said stepping mechanism to the pulses of the first digit of said code, said rack when advanced enabling said cam ended arm attached thereto to advance and disable said first drive pawl and enable a second drive pawl, and so forth, whereby said rack is further adapted to close signalling contacts to enable operation of said signal after having passed successively through the aligned slots in all four of said discs in response to the four successive digits of said code corresponding to the stepped position of said slots.

12. In a selective signalling system comprising a source of unrestricted digital pulse codes and a signal circuit to be operated by a given one of said codes, a mechanism responsive to any one of such codes but capable of operating said signal circuit only upon responding to said given one of said codes particular to said signal circuit, said mechanism comprising a stepping magnet responsive to all pulses of all coded digits, a plurality of coaxial parallel independently rotatable ratchet carrying discs, a stepping pawl for each ratchet, each disc having a radial slot in the periphery of said disc and adjustable along the periphery thereof, means for enabling said stepping magnet to step a different ratchet for each different digit of said code and in sequence to enable said means to test progressively the coincidence of the slots in said discs after the latter have been stepped in accordance with pulses of successive digits of said code and electromagnetically operated holding pawls to hold said ratchets and said means in advanced position, whereby said means is enabled to operate said signal circuit only after having successfully tested coincidence of all slots in all discs, which condition represents response of said mechanism to said given digit code to which the preset adjusted positions of said slots in said discs correspond.

13. In a selective signalling system comprising a source of unrestricted digital pulse codes and a signal circuit to be operated by a given one of said codes, a mechanism responsive to any one of such codes but capable of operating said signal circuit only upon responding to said given one of said codes particular to said signal circuit, said mechanism comprising a plurality of mutually parallel discs, each disc freely rotatable on a shaft common to all of said discs, each of said discs having a radial slot in the periphery thereof, a ratchet wheel attached to each disc and coaxial therewith, an electromagnet adapted to step successively said ratchets in response to pulses of successive digits of said code by means of stepping pawls actuated by said electromagnet and individual to each ratchet, electromagnetic holding means for retaining said ratchets in advanced stepped positions and mechanical means adapted to progress through said slots in said discs when said slots have been aligned by the pulse content of said given digit code and to be held progressed by said same ratchet holding means, said progression of said mechanical means enabling each succeeding stepping pawl to step its corresponding ratchet and disabling all other pawls for the duration of each coded digit, whereby said means operates the signal circuit after having progressed successfully through the slot of all of said discs.

14. In a selective signalling system comprising a source of unrestricted digital pulse codes and a signal circuit to be operated by a given one of said codes, a mechanism responsive to any one of such codes but capable of operating said signal circuit only upon responding to said given one of said codes particular to said signal circuit, said mechanism comprising a number of parallel coaxial ratchet carrying discs equal to the number of digits in said code, each disc having a radial slot located at one of a plurality of adjustable positions along the periphery of said disc and each ratchet being freely rotatable relative to the other ratchets, a stepping pawl for each ratchet, all of said pawls being actuated by a common electromagnet responsive to each pulse of said digital code, mechanical means adapted to progress through said slots in sequence providing same are advanced to the correct position by each successive digit of said code, said means upon progressing enabling each succeeding stepping pawl to step its respective ratchet in accordance with the pulses in the succeeding digit and disabling all other pawls, and electromagnetic holding means for holding all of said ratchets and said progressing means in advanced position, whereby said progressing means is adapted to operate said signal circuit only after progressing through the slot of each of said discs in sequence and thus having responded to a digit code necessary to permit operation of said signal circuit by virtue of preset positions of each of said slotted discs.

MARCELLUS B. McDAVITT.
DOREN MITCHELL.

REFERENCES CITED

The following references are of record in the file of this patent:

UNITED STATES PATENTS

| Number | Name | Date |
|---|---|---|
| 1,353,257 | Mample | Sept. 21, 1920 |
| 1,814,524 | Nelson | July 14, 1931 |
| 2,041,079 | Lyle | May 19, 1936 |
| 2,082,725 | Simmons | June 1, 1937 |